United States Patent Office 2,748,167
Patented May 29, 1956

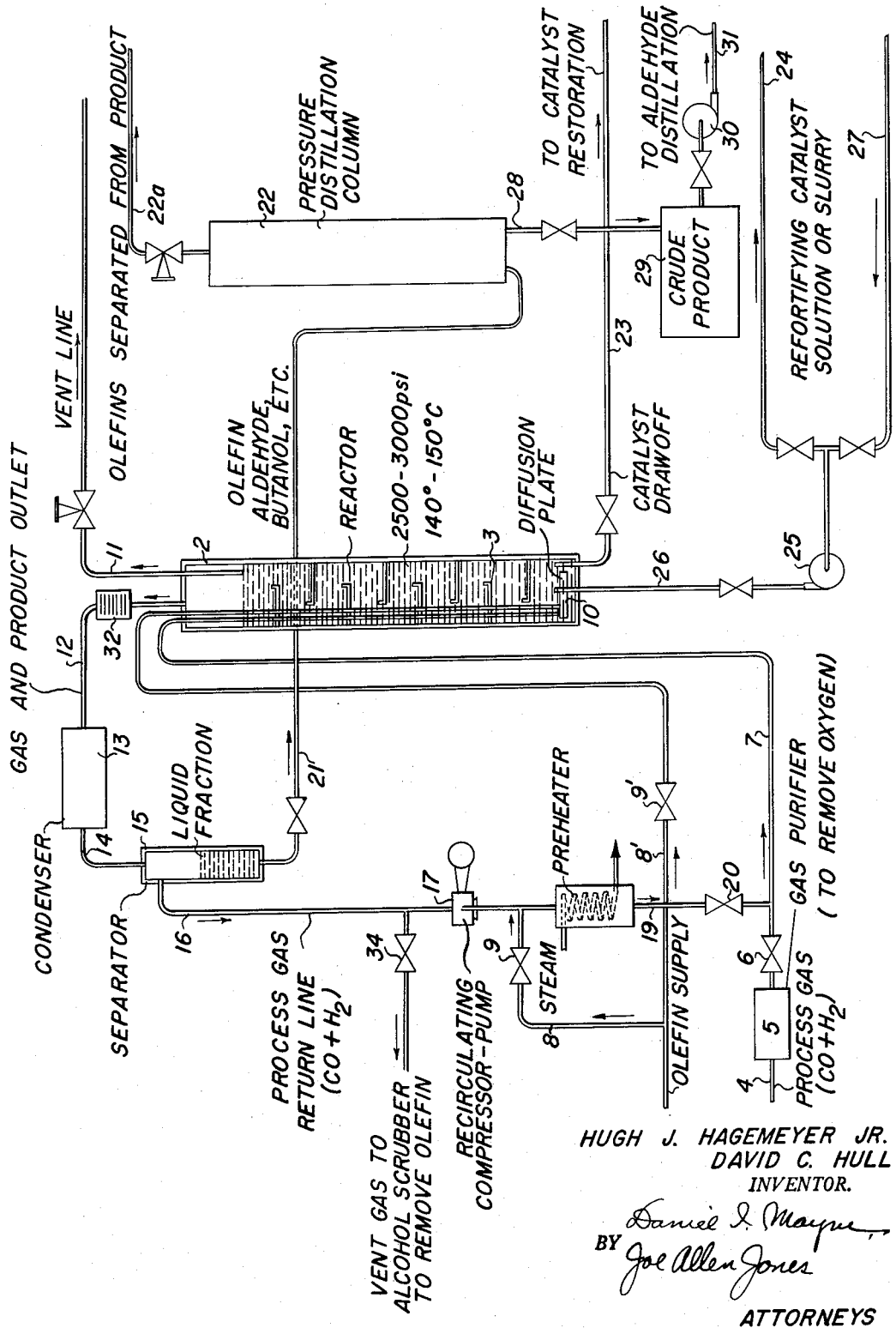

2,748,167

PROCESS OF PRODUCING OXYGENATED ORGANIC COMPOUNDS

Hugh J. Hagemeyer, Jr., Kingsport, Tenn., and David C. Hull, Longview, Tex., assignors to Eastman Kodak Company, Rochester, N. Y., a corporation of New Jersey Application November 5, 1952, Serial No. 318,888

9 Claims. (Cl. 260—604)

This application is a continuation-in-part of our co-pending application Serial No. 78,938 filed March 1, 1949, now abandoned.

This invention relates to the production of oxygenated compounds such as aldehydes, ketones, and the like by the reaction of olefins, carbon monoxide, and hydrogen in the presence of a catalyst. More particularly, this invention is concerned with a process of the type indicated wherein the yield of the oxygenated compound or compounds per pound of catalyst is increased several fold over the yields heretofore obtainable with known processes of the prior art and other advantages are obtained by the improved catalytic method and apparatus of the present invention.

The reaction of olefins with carbon monoxide and hydrogen to produce oxygenated compounds has been the subject of numerous publications and patents in recent years. In general, the reaction of various olefins with carbon monoxide and hydrogen to produce the corresponding aldehydes, ketones, and/or alcohols under various temperature and pressure conditions and the like have been described. Hence, it is necessary only briefly to refer to such aspects. While several different types of catalysts have been described, one of the most common referred to in the prior art appears to be composed of 36 percent cobalt, 2 percent thoria, 2 percent magnesia, and 60 percent kieselguhr. Such catalysts, for convenience of reference, will be referred to hereinafter as a solid catalyst, in keeping with the usual description of this type of catalyst in the prior art and particularly as respects foreign descriptions of processes of the type in question in which such catalysts are employed. It will be kept in mind that the specific solid catalyst composition just referred to is mentioned merely for purposes of illustration and that there are other operative cataysts as respects the present description.

When using a solid type of catalyst in reactions of the type in question, as for example, a suspension of such solid catalyst in a non-polar type of suspending medium, such as diesel oil, as described in technical reports on German work, several serious disadvantages have been encountered. That is, such solid catalysts heretofore have required special handling and techniques in trying to obtain a catalyst with suitable activity and longevity. Such prior solid catalysts are easily deactivated by small amounts of oxygen, sulfur and other impurities when used as has been customary in the prior art. The solid catalyst may thus quite quickly become inactive and hence must be periodically removed from the reactor in which it is used, digested with mineral acids, separated from high boiling materials and waxes, and reprecipitated on kieselguhr or similar material. The catalyst thus reworked must then be reduced with hydrogen for restoring activity prior to reuse. In addition to the disadvantages arising from this rejuvenation, there is a definite tendency for the cobalt present in the solid catalyst to form carbonyl derivatives and to become extracted from the catalyst bed or suspension which, of course, depletes the catalyst and causes the reaction in which it is being used to slow down or even to stop.

We have found that difficulties of the type indicated when using solid catalysts of this type and according to the procedures of the prior art can be minimized or eliminated to a substantial extent by the improved procedure of the present invention which is set forth in detail hereinafter.

This invention has for an object to provide a process for the production of oxygenated organic compounds by an improved catalytic procedure and apparatus layout. A further object is to provide for carrying out the reaction of olefins with carbon monoxide and hydrogen to prepare oxygenated organic compounds wherein the yield of oxygenated compounds per pound of catalyst is increased several fold over the yields obtainable by prior art and practice. Another object is to carry out a process of the type indicated wherein a high and more constant rate of reaction may be maintained, thereby facilitating, not only the synthesis operation, but also the separation and recovery of reaction products.

Another object resides in the feature of maintaining the olefin content in the recycle gas, feed stock and reactor space below 20% and preferably below 12% to suppress formation of waxes and olefinic condensation products which are absorbed by and deactivate the catalyst. A further object is found in the feature of maintaining the soluble cobalt content in the reactor space below 2% and preferably below about 0.5% by maintaining the carbon monoxide content of the synthesis gas below about 25% and maintaining a high rate of production. Still another object is to provide improved operation by passing the reactants into the upper end of the reactor and passing them substantially the entire length of the reactor before becoming released for commingling with the contents of the reactor. Other objects will appear hereinafter.

For a better understanding of the present invention reference will be made to the attached drawing forming a part of the instant application, which is a semi-diagrammatic side elevational view in the nature of a flow sheet, showing an apparatus arrangement particularly useful in carrying out the present invention.

As indicated above, one of the disadvantages encountered in industrial operation of processes of reacting olefins with carbon monoxide and hydrogen in the presence of a solid catalyst is that the life of the catalyst is usually relatively short, necessitating the removal from the reaction of the catalyst for regeneration or replacement. Expressed in another way, it may be said that the yield of product per pound of catalyst utilized in the process is relatively low. This results in increased cost, not only of catalyst materials, but also in the expense and loss of production time consumed in shutting down to change or regenerate the catalyst.

In the present invention we have found that the difficulties inherent in the use of the prior art catalysts can be minimized or substantially eliminated by using a solution and/or slurry of a cobalt compound selected from the groups represented by the cobalt carbonyls and/or the cobalt salts of the aliphatic carboxylic acids together with, or, where necessary, as an adjunct to, typical solid catalysts of the prior art. Other features such as the proper control of olefin and carbon monoxide content, as explained in greater detail elsewhere herein also contribute to the most efficient use of the catalyst, whereby maximum catalyst activity is maintained for long periods of time.

We have found that cobalt tetracarbonyl $Co(CO)_4$, di-meric cobalt tetracarbonyl $(Co(CO)_4)_2$ and cobalt tricarbonyl $(Co(CO)_3)_4$ dissolved in alcohols, aldehydes, ketones, hydroxyethers, etc., are suitable for the soluble portion of the catalyst. We have also found that it is practical to prepare the soluble portion of the catalyst in situ by adding a solution and/or suspension of a cobalt salt of an aliphatic acid such as cobaltous acetate, cobaltous propionate, and cobaltous butyrate and the like to the reactor containing the solid catalyst. Where a cobalt salt is used to introduce additional cobalt to the reactor, alcohols are the preferred solvents or suspending media and the conversion to a soluble carbonyl can be represented by the reaction:

$$Co(OCOCH_3)_2 + 4CO + 2ROH = Co(CO)_4 + 2ROCOCH_3$$

Non-polar solvents or diluents such as benzene, toluene, cyclohexane, etc., can also be used, but a much lower catalyst activity results, with a lower yield of oxygenated products for the same amount of catalyst usage.

Cobalt carbonyl alone is a catalyst for the Oxo reaction, but it is quickly deactivated in the absence of suitable buffering agents. In the present invention we have found that good catalytic activity can be achieved by using a solution and/or suspension of a cobalt compound, together with a solid catalyst containing metal oxides or hydroxides and combinations thereof selected from the oxides or hydroxides of metals of the group represented by thorium, aluminum, manganese, magnesium, cerium, chromium, and the alkaline and alkaline earth metals, with or without cobalt.

Oxo synthesis catalysts are usually comprised of cobalt and/or iron with substantial amounts of promoters such as alkali hydroxides and/or the oxides of magnesium, aluminum and/or thorium. The catalysts are expediently placed on carriers of large surface area such as kieselguhr, silica gel, natural or synthetic decolorizing earths, active carbon, pumice or metal oxides. Oxo synthesis catalysts can be regarded as complex action catalysts combining the several functions of carbonyl formation, condensation, hydrogenation and absorption. The original discovery of the metal carbonyls, as also the large scale preparation of these compounds hinges on the direct reaction between carbon monoxide and free reactive metals. With cobalt, iron and nickel this carbonyl formation is greatly accelerated by the use of increased pressures, 50–300 atmospheres; and temperatures, 100–300° C.

Under Oxo process conditions several competing reactions and absorption processes are thereby involved: absorption of the reaction gases, carbon monoxide, hydrogen and olefin, promoted by preparing the metal in a highly activated state by reduction; and the competing absorption of metal carbonyls, and preferential absorption of olefin which blocks access of the reaction gases to the metal surface.

Although some investigators have shown cobalt carbonyl to be a catalyst for the Oxo process, it is decomposed and quickly deactivated under Oxo conditions. In addition the formation of metal carbonyls in effect solubilizes the catalyst metal and as such it is extracted from the catalyst. This depletion of the metal content of the catalyst by the formation of metal carbonyl results in a low yield of oxygenated products per pound of catalyst and a short catalyst life. Where a solid catalyst is used cobalt functions both to form a carbonyl hydride group and as a hydrogen transfer catalyst. The oxides of magnesium, aluminum and thorium then promote the condensation of absorbed olefin with the carbonyl hydride and hydrogen to form the oxygenated compound. The reaction mechanism can be represented as follows:

$$2XCo^* + CO + H_2 \rightarrow XCo(COH) + XCo(H)$$
$$XCo(COH) + XCo(H) + R_2C=CR_2 \rightarrow R_2CHCR_2CHO + 2XCo^*$$

* Cobalt activated by reduction.

wherein X represents the body of the catalyst and R is hydrogen, alkyl, aryl or other hydrocarbon residue. As the effective 'activated' cobalt concentration becomes more dilute, individual carbonyl hydride groups and hydrogen atoms become too far removed from adjacent groups to permit extensive condensation with the olefin. With increasing dilution of the activated metal component the synthesis of oxygenated compounds decreases.

The absorption of olefins in high concentrations on the surface of the catalyst, and the absorption of high boiling condensation products and waxes also serves to deactivate the Oxo catalyst. This is particularly true with low molecular weight olefins such as ethylene, propylene, butylene and isobutylene which undergo self-condensation and/or polymerization to form high boiling oils and waxes which are difficult to remove from the reactor space and are absorbed by the catalyst which results in a diminished available catalyst surface. This results in a low yield of oxygenated materials before the catalyst must be removed from the reactor space and regenerated by extraction and/or reduction.

We have found that the maximum yield of aldehydes and rate of formation, the optimum catalyst activity and catalyst life, is obtained by maintaining the concentration of cobalt as soluble cobalt in the reactor space at less than 2 percent, and preferably less than 0.2 percent. We have also found that the deactivation of the catalyst by the absorption of olefins, condensation products, oils and waxes can be minimized by operating in a continuous fashion and by removing the oxygenated product and high boiling materials formed in the process continuously. The deactivation of the catalyst by the formation of metal carbonyls and by the preferential absorption of olefins and waxes resulting from the self-condensation and polymerization of the olefin can be minimized by careful control of the synthesis gas composition in the reactor space.

In the preferred method of operation the formation of heterogeneous end products, olefinic oils and waxes, and metal carbonyls is repressed and a more uniform reaction rate is obtained by carrying out the addition of CO and hydrogen to the olefinic compound in the presence of catalysts containing carbonyl-forming metals as rapidly as possible. In order to realize this the addition of CO and hydrogen to the olefin must proceed very rapidly, more rapidly than carbonyl formation and/or olefinic homo-condensation of homopolymerization and the oxygenated product must be removed continuously from the reactor space.

The reaction of an olefin with carbon monoxide and hydrogen with the mixed catalysts of the present invention is carried out at 75 to 250° C. and 40–700 atmospheres. The preferred temperature range for the production of aldehydes is 140±10° C.

The solid portion of the catalyst is prepared by precipitating the metals on kieselguhr, filtercel or the like, as the carbonates or hydroxides. Where cobalt is included in the solid catalyst, the catalyst is dried and reduced at 250–450° C. in a stream of hydrogen. The reduced catalyst is cooled in a hydrogen atmosphere and quenched in the selected organic diluent. If the solid catalyst contains no cobalt, it is sufficient to heat the catalyst in air to insure the presence of thorium, magnesium, manganese and/or cerium as the oxides. However, a more active catalyst material is obtained by carrying out the decomposition in a hydrogen atmosphere. Temperatures between 300–500° C. are usually employed.

In practice, either in intermittent batchwise or continuous operation, the slurried solid portion of the catalyst is added to the reactor and, where necessary, may be gradually fortified with a cobalt carbonyl compound and/or the cobalt carbonyl-forming portion of the catalyst.

The catalyst is maintained at maximum activity by intermittently or continuously removing catalyst slurry, regenerating or revivifying the catalyst as discussed in

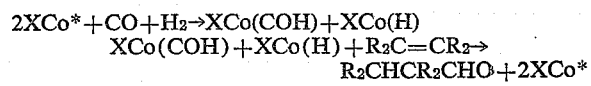

greater detail below, and returning fresh or revivified catalyst in slurry form to the reactor. It is preferable to add fresh or revivified catalyst continuously and to remove catalyst intermittently for regeneration.

By the catalyst handling as described herein, including continuously or intermittently fortifying or regenerating the catalyst, the yield of oxygenated compounds, aldehydes, ketones and alcohols per pound of catalyst is increased three to ten times over what is possible without such procedure. In addition, a more constant rate of reaction can be maintained which is advantageous, both in carrying out the reaction and in the separation of the reaction products in good yield.

Our invention will be more fully understood by reference to the drawing which illustrates a preferred apparatus arrangement for carrying out the process.

Numeral 2 designates a suitable elongated hollow reactor, distributed in the interior of which, in staggered relation one to another, are a plurality of partial plates or trays 3 which, as shown, are so disposed as to extend only partly across the cross-sectional area of the reactor. These plates are also so positioned as to provide for catching and at least temporarily retaining solid catalyst, introduced as a slurry in a solvent or suspending medium such as butanol, thus assuring proper and uniform distribution of the catalyst material within the reactor.

Reactor 2 is also provided with a valved inlet conduit 4 for the introduction from an appropriate source (not shown) of an equimolecular mixture of carbon monoxide and hydrogen (hereinafter identified as process gas) under pressure. This mixture preferably is passed through a gas purifier 5 before being fed at a predetermined rate through valve 6 into inlet conduit 7 and thence into the top of the reactor.

An olefin feed line 8 is connected to the reactor system just before the preheater 18. Through inlet conduit 8 an appropriate feed of olefin such as ethylene or propylene, also under pressure may be fed in metered amounts through valve 9 to the reactor system as will be further described hereinafter. When the olefin is a liquid at normal temperatures and pressures it may be desirable to feed it through conduit 8' in metered amounts through valve 9' to the reaction space. Instead of diffusion plate 10 a nest of 3 or 4 screens may be substituted. This is particularly advantageous where a slurry catalyst is used.

It will be noted from the drawing that the conduits 8' and 7 for feeding reactants to the reactor extend into the upper end of the reactor and terminate near the lower end thereof. In a large diameter reactor this actually provides an internal method of heating or cooling the contents of the reactor as required. It in effect provides additional surface for heat transfer not otherwise available. It has the additional advantage of smoothing out the operation in that the gas feed comes in contact with the reactor contents at substantially the same temperature as the reactor contents. It has the purely mechanical advantage in that the contents of the reactor do not flow back into the feed lines in case of compressor or pump failure. Still another advantage of this feed pipe arrangement in the oxonation of propylene is that it avoids the feeding of slugs of liquid propylene to the reactor. It has been shown that such slugs of liquid propylene deactivate the catalyst.

Number 11 designates a conduit which provides a safety vent for releasing pressure within the reactor, and also a connection through which appropriate liquid level-indicating devices may be attached to the reactor as desired.

Numeral 12 designates a gas and product outlet conduit through which unreacted process gas and vaporized product materials such as propionaldehyde and normal- and iso-butyraldehydes and other products, as well as the butanol or other oxygenated catalyst solvent or suspending medium, may escape from the reaction space. Conduit 12 may be cooled and the outer condenser jacket, numeral 32, provides a means for regulating the rate at which the condensable liquids are removed from the reactor space and is also used to maintain the reactor liquid in the reactor space at the desired level. This conduit 12 is connected to a condenser 13 (supplied with any appropriate cooling medium, in which the vaporized materials such as aldehydes, butanol, etc., are condensed. The gas and condensate (containing dissolved or occluded olefin) passes therefrom through conduit 14 to a liquid-gas separator 15 wherein the uncondensables (in this case, unreacted carbon monoxide and hydrogen) are separated from the liquid portion. The gaseous portion passes through conduit 16 to a recirculating compressor pump 17 and thence through preheater 18, conduit 19, and valve 20 back into the main process gas supply line 4 for reintroduction to the reactor 2.

Liquid-gas separator 15 is also provided with a valved conduit 21 through which the separated liquid material may be conveyed to a pressure distillation column 22 for further treatment. The bottom of this column is connected by valved conduit 28 to crude product storage tank 29, from which the material may be removed by pump 30 and conduit 31 to an appropriate rectification operation in which the aldehyde components and other reaction products may be separated one from another and thus obtained in purified form.

Conduit 33 which is connected to line 16 from the liquid-gas separator designates a conduit through which spent gas may be removed through valve 34 to reduce the inerts which build up in the gas in the reactor space and thus to maintain the desired synthesis gas composition. The vent gas may be fed to an alcohol scrubber (not shown) to recover the olefin portion of the gas.

Referring again to reactor 2, this unit is also provided with a valved conduit 23 through which spent catalyst liquid or slurry may be withdrawn and conveyed to any appropriate catalyst restoration or revivification treatment such, for example, as extraction with butanol, reduction with hydrogen, etc.

As previously indicated, it is sometimes desirable to refortify the catalyst solution or slurry to provide for a substantially constant supply of soluble cobalt in the reaction liquid. However, refortification by addition of soluble cobalt may not be necessary except under special circumstances, such as when the reaction gets out of balance as through malfunctioning of some regulatory part, as it is desirable, as pointed out elsewhere herein, to maintain the soluble cobalt content of the reactor in a very low range. Fortification is accomplished by circulating the refortifying solution through valved lines 24 and 27, feed to the reactor 2 being accomplished by pump 25 which draws catalyst solution from the circulating liquid and forces it through valved conduit 26 connected, as shown, to the lower part of the reactor.

The catalyst solution or slurry can also be fed in at the top of the reactor such as, for example, through any one or all of the liquid level determining lines or through a separate conduit to further insure the even distribution of catalyst throughout the reactor.

Before commenting on the operation of the apparatus above described, perhaps it should be generally mentioned that, as shown, the whole system is under pressure. Therefore, it will be understood that the process gas introduced through conduit 7 and the olefin gas introduced through conduit 8 will be pumped from suitable supplies of these gases, also under pressure, and that these sources of supply, as well as other parts of the apparatus, will be equipped with suitable compressor pumps, gauges, flow indicators, and other devices for properly controlling, measuring and maintaining the proper rates of flows of each of the gaseous and liquid materials into and out of the process. Since such details are within the knowledge of those skilled in the art to which the present invention relates, they are not shown or described in detail in the present disclosure.

Incidentally, it may again be noted that distillation column 22 is operated under pressure, to separate the dissolved olefin gas from the aldehyde and other liquid components fed to it through conduit 21, primarily to make it possible to return the olefin to the main olefin supply under pressure and thus avoid the necessity of recompressing it. On the other hand, it will be understood that column 22 may be operated at ordinary pressures, if desired, so far as the distillation itself is concerned.

The operation of the above described apparatus when used in accordance with our invention is as follows: An appropriate catalyst slurry, made up by suspending a reduced catalyst composed, for example of 36 per cent cobalt, 2 per cent thoria, 2 per cent magnesia, and 60 per cent kieselguhr in butanol or other appropriate polar solvent, is charged to reactor 2, filling it to an appropriate level, as, for example, to a point a little above the level of the top partial plate as shown. The slurry is heated to an appropriate initial temperature such as 120° C. by introducing preheated process gas (which may contain about 29% CO and about 54% $H_2$) to the reactor through conduit 7 until the desired temperature has been attained. The olefin gas is then introduced gradually through conduit 8 and the reaction thereafter continues with both the process gas and olefin flowing continuously into the bottom of the reactor.

Since the Oxo reaction between olefin, carbon monoxide and hydrogen to produce aldehydes is exothermic, the heat evolved will ordinarily provide a major portion of the total heat required to maintain the temperature of the reaction liquid at the desired point, as, for example, a temperature within the range of 75° to 250° C. and, under ordinary operating conditions, within the preferred range of 140° to 150° C. The pressure under these conditions is maintained within the range of 40 to 700 atmospheres, the preferred range being of the order of 2500 to 3000 p. s. i.

Under the relatively high temperature conditions prevailing, the principal products of the reaction, namely, normal butyraldehyde and isobutyraldehyde—together with a certain amount of the solvent or suspending medium for the catalyst and unreacted process and olefin gas—will be carried out of the reactor as a gas-vapor mixture through conduit 12 and thence to condenser 13 where the condensables such as the aldehyde and the solvent component will be condensed, thence passed through conduit 14 to liquid gas separator 15. In the separator the liquid portions, together with some dissolved or occluded olefin, are withdrawn from the bottom of the separator and conveyed by conduit 21 to pressure distillation column 22.

The uncondensed material, consisting principally of unreacted process gas, is withdrawn from the separator through conduit 16 by recirculating compressor pump 17 which forces it through preheater 18 to the main process gas inlet conduit 7. In preheater 18 the unreacted gas is heated to a sufficiently high temperature to enable it to function as an additional source of heat for the reaction liquid in reactor 2 when it is cycled thereto through conduit 7. In other words, the heat added to the process gas in the preheater makes up the difference between heat derived from the exothermic Oxo reaction and that lost as latent heat by vaporization to produce in the reaction liquid the desired temperature, as for example, a temperature within the range of 140° to 150° C.

The liquid leaving separator 15 through conduit 21 is distilled under pressure in column 22 where the olefin content leaves the column, still under pressure, and is returned to the main olefin supply, as previously indicated. The liquid portion of the material passes from the column through conduit 28 in the form of crude product to storage tank 29, from which it may be removed as desired via pump 30 and conduit 31 to any suitable operation, such as distillation, to obtain the various aldehydes in purified form and to recover any butanol solvent which may have been carried along.

As previously indicated, one of the outstanding features of the present invention is our discovery that the catalyst activity may be maintained by continuously or intermittently supplying the reactor, as needed, with a source of soluble cobalt, such as an alcoholic solution of cobalt tetracarbonyl, as such, or with a slurry composed of a lower aliphatic acid salt or cobalt, such as cobaltous acetate, or a slurry of a reduced cobalt catalyst suspended in butanol or other appropriate polar solvent from which the soluble cobalt tetracarbonyl may be formed in the reactor in situ. This is accomplished in the apparatus shown by pumping the refortifying catalyst solution or slurry from line 27 through conduit 26 into the reactor as needed. It will, of course, be understood that a sufficient volume of liquid will be removed from reactor 2, either in the form of vaporized product or solvent or of the spent or partially spent catalyst solution itself to make room for the required volume of refortifying solution. Such operation maintains the catalyst at maximum activity. The desirability of maintaining the soluble cobalt concentration at below 2% and preferably below about 0.5% must of course be kept in mind in controlling the feed of soluble cobalt to the reactor.

An added feature of our improved process is the removal from time to time of portions of the solid cobalt, in reactor 2 which may have become contaminated and rendered inactive or at least ineffective catalytically by accumulation on the surfaces of the solid particles of high boiling materials or waxes. In order to keep the catalyst in a continuously active condition a portion of the slurry containing the inactive or deactivated catalyst material is withdrawn through conduit 23 and subjected to an appropriate revivification or restoration, as, for example, by dissolving off the accumulation of high boiling materials by extraction with butanol or similar appropriate solvent followed, if desired, by reduction in a current of hydrogen. After such treatment the catalyst may be introduced into the reactor in the form of a solution or slurry, as desired, thus refortifying the catalyst.

In drawing off catalyst for regeneration, a catalyst receiver (not shown) connected to line 23 is pressured to about 3500 p. s. i. with gas from the primary synthesis gas compressor (not shown). A valve in a line between the top of the reactor and the top of the catalyst receiver is opened, thus equalizing the pressure on the two. When the unnumbered valve in line 23 connecting these two vessels is opened, the catalyst slurry flows into the catalyst vessel until the levels are equalized. After flushing the lines by means of a flushing butanol pump (not shown) the bottom valve is closed. The gas is slowly vented from the catalyst vessel and after the pressure has been reduced to atmospheric, the catalyst slurry is pumped from the catalyst receiver to the recovery and regeneration process.

The catalyst slurry is washed with hot butanol, the reduced and unreduced portions of the catalyst are separated and the reduced portion is ball milled, after which it is reslurried and fed to the reactor as desired. The unreduced portion is dried, ball milled, reduced and reslurried.

It may be noted that control of the liquid level in reactor 2 may be accomplished by controlling the feed of the process gas to the reactor, either through the main process gas supply line 4 or by recirculating separated process gas coming from preheater 18. In other words, the liquid level in the reactor can be lowered simply by increasing the amount of process gas feed. Under these circumstances more aldehyde product, butanol, solvent, etc., are removed through conduit 12, container 13 and liquid gas separator 16. The liquid level in the reactor is also susceptible of temporary adjustment through, or at least is momentarily influenced by, withdrawal of liquid through conduit 23 and introduction of refortifying solution through conduit 26.

As previously stated the liquid level can also be controlled in part by cooling on conduit 12, such as by reflux condenser 32 already referred to. This is important since it allows a greater portion of synthesis gas to be recirculated than is ordinarily used in removing aldehydes and solvents from the reactor and thus any desired degree of agitation can be obtained in the reactor space. This also effects higher concentrations of aldehyde in the crude product which in turn reduces the amount of dissolved olefin which must be removed by column 22. The high rate of feed thus causes a higher rate of reaction and also accelerates volatilization in the reactor.

Our process will be more fully understood by reference to the following specific examples in which we have set forth several of the preferred embodiments of our invention, but it is to be understood that they are included merely for purposes of illustration and not as a limitation thereof.

*Example I*

A reactor of the type described above about 20' high and 9" inside diameter was charged with a slurry made up of 30 pounds of a solid catalyst composed of 36% cobalt, 2% thoria, 2% magnesia and 60% kieselguhr in 20 gallons of butanol. The catalyst was 64% reduced, as measured by hydrogen evolution, and had been ball milled to a 200–400 mesh particle size. The slurry was heated to 120° C. at 2000–3000 p. s. i. by cycling a feed gas containing 39.5% CO and 54.1% hydrogen through a heat exchanger and then through the slurry in the reactor. Propylene was pumped into the reactor gradually and the exothermic reaction following was allowed to bring the reactor temperature to a temperature of 140±5° C. This temperature was maintained by controlling the temperature of the recycled process gas and by separating out by volatilization the mixture of normal- and iso-butyraldehydes as it was formed. The aldehyde product and some butanol was condensed in a separator pot and bled to an atmospheric distillation system.

The gas composition from the reactor was sampled at intervals and the following are representative compositions:

| | $C_3H_6$ | CO | $H_2$ | $CO_2$ | $C_3H_8$ | $O_2$ | $N_2$ |
|---|---|---|---|---|---|---|---|
| 1 | 36.3 | 22.5 | 34.5 | 0.2 | 1.2 | 0.4 | 4.9 |
| 2 | 22.8 | 17.5 | 35.9 | 1.0 | 1.6 | 0.3 | 20.9 |

A portion of the gas was vented continuously to keep the inerts at less than 25% of the recycle gas.

A 1.6 per cent solution of cobalt tetracarbonyl in butanol was fed to the reactor continuously and at such a rate as to maintain a soluble cobalt concentration in the reactor solution of 0.01–1.0 per cent. The cobalt carbonyl was prepared by reacting a slurry of cobalt acetate in butanol with carbon monoxide at 2000–3000 p. s. i. and 175–195° C. The crude solution of cobalt carbonyl, which also contained an undetermined amount of cobalt carbonyl hydride, was diluted with butanol until the desired 1.6 per cent solution of cobalt carbonyl was obtained and the solution was fed to the reactor as described above. A major portion of the cobalt carbonyl was recovered from the base heaters of the product distillation system as a solution in butanol and higher boiling oxygenated products and was recycled to the reactor.

An average of 628 pounds of mixed aldehydes per pound of cobalt was obtained before regeneration of the catalyst was required.

*Example II*

With the same type of reactor and operating conditions described in Example I and using a solid catalyst of the same composition and 72 per cent reduced, the soluble cobalt composition was maintained by adding cobaltous acetate continuously to the reactor. The cobaltous acetate was ground to 300–400 mesh and pumped in as a 2 per cent slurry in butanol, where it was converted to cobalt carbonyl in situ and the cobalt carbonyl was recovered as a solution in butanol and higher oxygenated products from the base heaters of the product distillation system. Additional cobaltous acetate was slurried with the overflow from the base heaters before recycling to the high pressure system in order to maintain a soluble cobalt concentration in the reactor of 0.6–1.2 per cent.

An average of 712 pounds of mixed aldehydes (normal- and iso-butyraldehydes) per pound of cobalt was obtained before regeneration of the catalyst was required.

*Example III*

A solution of cobalt tricarbonyl was substituted for the cobalt tetracarbonyl of Example I. An average of 1026 pounds of mixed aldehydes per pound of cobalt was obtained.

Cobalt tricarbonyl was obtained as a black crystalline material analyzing 59.3 per cent CO (theoretical 58.7 per cent) by refluxing dimeric cobalt tetracarbonyl in benzene until the required amount of carbon monoxide was evolved, in accordance with the equation:

$$2[Co(CO)_4]_2 \rightarrow [Co(CO)_3]_4 + 4CO$$

*Example IV*

A solution of cobalt carbonyl butanol complex was substituted for the cobalt tetracarbonyl of Example I. An average of 904 pounds of mixed aldehydes per pound of cobalt as obtained.

Cobalt carbonyl butanol was obtained by refluxing a solution of dimeric cobalt tetracarbonyl in butanol until the required amount of carbon monoxide was evolved, in accordance with the equation:

$$[Co(CO)_4]_2 + C_4H_9OH \rightarrow CO_2(CO)_5 \cdot C_4H_9OH + 3CO$$

*Example V*

A reactor 20' high and 9" inside diameter was charged with a slurry composed of 30 pounds of a solid catalyst with the composition 36 per cent cobalt, 2.6 per cent thoria, 1.8 per cent magnesia suspended on filtercel in 20 gallons of diethyl ketone. The solid catalyst was 71 per cent reduced and had been ball milled to a 300–400 mesh particle size. The reactor was heated to 135° C. at 3000 p. s. i. by cycling a feed gas with 42 per cent carbon monoxide and 49 per cent hydrogen through a heat exchanger and then through the reactor.

A feed gas with the composition 24 per cent ethylene, 31 percent carbon monoxide and 39 per cent hydrogen was pumped into the reactor and the reaction temperature was maintained at 140±10° C. by controlling the temperature of the incoming recycle gas and by distilling out the propionaldehyde as it was formed. An alternative method of controlling the reaction temperature is to vary the olefin content of the feed gas. A two per cent solution of cobalt tetracarbonyl in diethyl ketone was fed continuously to the reactor and at such a rate as to maintain a soluble cobalt concentration in the reactor of 0.8 to 1.8 per cent.

Gas was recycled through the reactor and propionaldehyde was distilled out as it was formed. The reactor level was maintained between half and two thirds full also by controlling the volume of gas cycled through the reactor. The product was bled off to a feed heater where the aldehyde and some diethyl ketone was flashed to the product distillation system. The overflow from the feed heater was returned to the reactor.

An average of 817 pounds of propionaldehyde per pound of cobalt was obtained before regeneration of the catalyst was necessary.

*Example VI*

In another example carried out in a manner similar to Example I and using the same catalyst slurry, a synthesis gas having a composition varying between 4–15% propylene, 6–25% CO, less than 0.02% oxygen and the remainder hydrogen and as much as 20% inerts, was used. Average analyses of the gas being cycled through the reactor space were:

| Percent C₃H₆ | Percent CO | Percent H₂ | Percent Inerts |
|---|---|---|---|
| 9.5 | 25.0 | 51.6 | 14.9 |
| 10.1 | 20.8 | 56.8 | 12.3 |
| 9.8 | 15.4 | 62.1 | 12.7 |
| 12.8 | 17.8 | 55.8 | 13.6 |

These average analyses were taken on typical operating days during the run with an average daily production of 1250–1600 pounds of mixed butyraldehyde. The percent cobalt as soluble cobalt in the reactor liquid averaged 0.02–0.04 percent.

The make up gas supplied to the reactor space via the primary compressor constituted less than 5 per cent of the gas stream being cycled through the reactor. A reaction pressure of 2400–2900 p. s. i. was maintained throughout the run.

In a run which produced 17,016 pounds of mixed aldehydes in the ratio of 1.86 normal butyraldehyde to one isobutyraldehyde, the loss in cobalt content for 64 pounds of catalyst was 6.15 pounds and the recovered oxidized catalyst contained 30.1% cobalt. This is equivalent to one pound of cobalt per 2,770 pounds of mixed aldehydes. The 17,016 pounds of distilled aldehydes contained less than 0.2 pound of cobalt by analysis. Only 768 pounds of high boilers, largely butals, were formed. The butals are recoverable as aldehydes and alcohol by distilling in the presence of dilute $H_2SO_4$.

*Example VII*

This example uses propanol as the medium in place of the preferred butanol, but shows the applicability of the other features referred to herein.

Ethylene, carbon monoxide and hydrogen were reacted as in Example I to form propionaldehyde and diethyl ketone. 75 pounds of a catalyst with the composition 31.0% cobalt, 3.6% thoria, 1.8% magnesia, 63.6% kieselguhr and 72 per cent reduced was used. The reactor was charged with a slurry containing 25 pounds of catalyst in 23 gallons of propanol. A temperature of 140±5° C. was maintained at 2500–3100 p. s. i. The synthesis gas composition cycled through the reactor varied between 9–14% ethylene, 12–25% carbon monoxide, less than 0.02 per cent oxygen with the remainder of the gas consisting of hydrogen and as much as 18–20% inerts. The per cent cobalt as soluble cobalt in the reactor liquid averaged 0.038–0.056 per cent.

14,560 pounds of propionaldehyde and 1,160 pounds of diethyl ketone was produced in addition to 1,890 pounds of high boilers composed largely of alpha methyl beta ethyl acrolein and propional. The loss in cobalt content for 75 pounds of catalyst was 5.94 pounds and the recovered oxidized catalyst contained 23.7 per cent cobalt. This is equivalent to 2,450 pounds of propionaldehyde per pound of cobalt lost through solubilization.

Example VI and VII show the applicability of the present invention to ethylene and propylene as well as the use of both butanol and propanol as the medium. All of the examples, show the importance and the cooperative relationship between the following features:

Of foremost importance is the manner in which the temperature in the reaction zone is controlled. This control is exerted by a novel and inventive combination of features which include (1) the recycling of gases which permits a high rate of gas feed to the reaction zone with the resulting high rate of reaction and volatilization, (2) the utilization of this increased rate of volatilization to prevent the temperature from rising above the desired upper limit and (3) the addition of heat to the gases being recycled, thereby assisting in preventing the temperature in the reaction zone from dropping below the desired lower limit as well as assisting in the rapid volatilization of products. This heating of recycle gases is also highly important in that it serves for the addition of heat to the reaction zone to bring the zone up to the reaction temperature range. Feature (4) is the immediate removal of the gases and vapors evolved from the surface of the reaction zone, thereby encouraging and promoting further volatilization. Feature (5) is the fact that the sole means for maintaining the reaction temperature within the upper limit of the desired temperature range is the thus encouraged volatilization, together with the correlation of the feed of reactants and the amount of heat added to the recycled gases. As feature (6) it is highly important to the obtaining of a high yield of aldehyde product that the aldehyde product be removed as quickly as possible from the reaction zone, thus avoiding undesirable side reactions such as formation of aldehydic condensation products which decrease the yield. Feature (7) resides in the preheating of the carbon monoxide and hydrogen before they enter the reaction zone, thus permitting the use of higher olefin concentrations without quenching the reaction at the point of entry by cooling, and thus giving a higher rate of production for a given reactor space. By feature (8) the liquid products which are separated from the reaction by volatilization and then removed from the gases in the condensation step provide substantially the sole source of aldehyde product.

Features (9), (10), and (11) are not critical to the successful functioning of the combination of the first eight features, but provide an improvement over them, and by use of these three features with the first eight, improved results are obtained, and all eleven features cooperate in producing these improved results.

Feature (9) is the maintaining of the olefin content below 20% (preferably below 12%) in the reactor to suppress formation of waxes and olefinic condensation products which are absorbed by and deactivate the catalyst. Thus more efficient catalyst utilization is provided and the catalyst needs to be removed and regenerated less frequently. With a typical solid Oxo catalyst as in Example I and 40–70% reduced, 1000–5000 pounds of aldehydes per pound of catalyst is obtained at 85–95% aldehyde yields.

Feature (10) resides in the holding of the soluble cobalt content in the reactor space at below 2% and preferably below 0.5% by maintaining the carbon monoxide content of the synthesis gas below about 25% (preferably below 20%) and maintaining a high rate of production. Intermittently removing a portion of the catalyst and reactivating by extraction and/or reduction and supplying fresh and/or reactivated catalyst to the reactor space maintains a high rate of production and a longer catalyst life. Cobalt carbonyl catalyzes olefin condensation under Oxo conditions, e. g.,

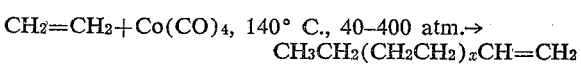

$$CH_2=CH_2 + Co(CO)_4, 140° C., 40-400 \text{ atm.} \rightarrow$$
$$CH_3CH_2(CH_2CH_2)_xCH=CH_2$$

and therefore the method of operation must be one that keeps the soluble cobalt to a minimum. Water gas containing 30–40 per cent CO and 50–60 per cent hydrogen is satisfactory since the makeup or fresh gas supplied to the reactor is only a small fraction of the gas being circulated through the reactor space. The CO content and the percent utilization of the synthesis gas is regulated by venting continuously or intermittently after the liquid-gas separator product pot and before the suction on the circulatory compressor to bleed off inerts in the recycle gas.

Feature (11) resides in the feeding of the reactants into the reactor through a pipe extending into the upper end of the reactor and terminating near the lower end of the reactor. In a large diameter reactor this actually provides an internal method of heating or cooling the contents of the reactor as required. It in effect provides additional surface for heat transfer not otherwise available. It has the additional advantage of smoothing out the operation in that the gas feed comes in contact with the reactor contents at substantially the same temperature as the reactor contents. It has the purely mechanical advantage in that the contents of the reactor do not flow back into the feed lines in case of compressor or pump failure. Still another advantage of this feed pipe arrangement in the oxonation of propylene is that it avoids the feeding of slugs of liquid propylene to the reactor. It has been shown that such slugs of liquid propylene deactivate the catalyst.

Although the above examples relate to continuous processing, it is apparent that the same or similar catalyst compositions can be used to advantage in batchwise and intermittent batchwise operations.

While in the above description reference has been made to a catalyst composed of cobalt, magnesia, thoria, and the like as this is one of the best known and most commonly used catalysts for this type of process in the prior art, the process of the present invention may be applied to the refortification of other types of catalysts used in processes for reacting olefins, carbon monoxide, and hydrogen. For example, the sulfactive hydrogenation catalyst described in companion, copending United States patent application Serial No. 24,095, filed April 29, 1948, now Patent No. 2,691,045, may be utilized in a process such as has been described herein. Other changes may be made in the process such as, for example, a fixed bed catalyst comprising cobalt on silica gel; cobalt and thoria on pumice; and, cobalt-thoria-magnesia-kieselguhr pellets together with the cobalt carbonyl and/or cobalt carbonyl forming portion of the catalyst may be used. It will be obvious that although such catalysts would be less desirable than those of the preferred forms of the invention, a number of the features of the present invention are applicable to such fixed bed operation.

While we have found it convenient to illustrate our invention by reference in the above examples to the use of butanol as the oxygenated solvent or suspending medium for our cobalt catalyst as used in the process, other oxygenated compounds may be employed with substantially the same or comparable efficiency. For example, in place of butanol we may employ ethanol, propanol, isopropanol and other alcohols. Various ketones may be employed for the same purpose, typical ketones being acetone, methyl ethyl ketone, diisopropyl ketone and the like. The ease of separation of product and medium is a factor in the choice of the medium. Similarly, various hydroxy ethers may be employed, as well as a certain amount of water. It should be noted that one of the distinguishing features of the instant process is the use, in the manner specified, of these oxygenated solvents or suspending media for the catalyst, as distinguished from the practice prevalent in related processes of the prior art of employing various hydrocarbon compounds of both the aliphatic and aromatic series, which compounds have been found to give a much lower efficiency of operation and lower yields.

From the foregoing it is apparent that we have provided an improved process for reacting olefins, carbon monoxide, and hydrogen which is of considerable practical and economic value in that the yield of oxygenated compound obtainable per pound of catalyst required in the process is increased several fold. In addition there are the added advantages of longer periods of uninterrupted operation, as well as a more constant rate of reaction, because by means of the refortification of the catalyst by the present invention, the catalytic reactivity is not continually diminishing. The refortification and regeneration are carried out keeping in mind the desirability of having the soluble cobalt concentration in the reaction be below 2% and preferably below about 0.5%. As will be apparent to those familiar with this type of process, relatively uniform and constant operation is particularly helpful in that the loads on the distillation columns and the like are steady and easy to operate.

While an operative range of 75–250° C. has been given herein, and a preferred range of 140°±10° C., the range of 90°–175° C. is the practical operative range for commercial operation.

We claim:
1. An improved continuous process for preparing butyraldehyde by the catalytic reaction of propylene, carbon monoxide and hydrogen at 40–700 atmospheres and 75–250° C., characterized by the steps of continuously feeding propylene and preheated carbon monoxide and hydrogen under pressure into a reaction zone comprising an enclosed body of butanol in which is suspended a reduced cobalt-containing catalyst carried on a finely divided inert carrier, removing gases as they are evolved from said zone, heating said gases and then recycling them to the reaction zone to attain the reaction temperature of 75–250° C., thereafter continuing said feed and continuously removing substantially all of the aldehyde product together with reactants and butanol in gaseous and vapor form as soon as they are volatilized from said body of butanol and catalyst, thereby promoting such volatilization which, together with the correlation of the olefin content of the feed and the amount of heat added to the recycle gases, constitutes the sole means for maintaining the reaction temperature within the upper limit of the reaction temperature range, condensing liquid products and butanol removed from said reaction zone to separate them from gaseous reactants, continuing the recycling of the separated gases in relatively large quantities to said reaction zone to provide a high degree of agitation and thereby a high rate of reaction and volatilization, while the heat added thereto in the reheating step assists in maintaining the reaction temperature within the lower limit of the reaction temperature range as well as assisting in volatilization of products, and passing the liquid products and butanol separated by said condensation to further separatory treatments which provide substantially the sole source of aldehyde product.

2. A process according to claim 1 wherein the liquid level in the reaction zone is controlled by correlation of the feed rate of carbon monoxide and hydrogen to the reaction zone, the withdrawal of liquids and suspended catalyst from the reaction zone, and the reflux cooling of vapors evolved from the reaction zone.

3. A process according to claim 1 wherein the catalyst content of the reaction zone is fortified with butanol containing a soluble cobalt derivative.

4. A process according to claim 1, wherein the soluble cobalt content in the reaction zone is held below 2% by maintaining the carbon monoxide content of synthesis gases in the reaction zone below about 25%.

5. A process according to claim 1, wherein the olefin content of the synthesis gas in the reaction zone is maintained below about 20% to suppress formation of waxes and olefinic condensation products which adversely affect catalyst activity.

6. A process according to claim 1, wherein the reactants pass into the upper end of the reaction zone and travel substantially the length of the zone before becoming commingled with the contents of the reaction zone.

7. A process according to claim 1, wherein the soluble cobalt content in the reaction zone is held below 2% by maintaining the carbon monoxide content of synthesis gases in the reaction zone below about 25%, the olefin content of the synthesis gas in the reaction zone is maintained below about 20% to suppress formation of waxes and olefinic condensation products which adversely affect catalyst activity, and the reactants pass into the upper end of the reaction zone and travel substantially the length of the zone and through substantially the entire height of the body of liquid in the reaction zone before becoming commingled with the contents of the reaction zone.

8. An improved continuous process for preparing a lower aliphatic aldehyde by the catalytic reaction of a 2-4 carbon olefin, carbon monoxide and hydrogen at 40-700 atmospheres and 90-175° C., characterized by the steps of continuously feeding olefin and preheated carbon monoxide and hydrogen under pressure into a reaction zone containing an enclosed body of a 2-5 carbon monohydric aliphatic alcohol in which is suspended a reduced cobalt-containing catalyst carried on a finely divided inert carrier, removing gases as they are evolved from said zone, heating said gases and then recycling them to the reaction zone to attain the reaction temperature of 90-175° C., thereafter continuing said feed and continuously removing substantially all of the aldehyde product together with reactants and alcohol in gaseous and vapor form as soon as they are volatilized, thereby promoting such volatilization which, together with the correlation of the olefin content of the feed and the amount of heat added to the recycle gases, constitutes the sole means for maintaining the reaction temperature within the upper limit of the reaction temperature range, condensing liquid products and alcohol removed from said reaction zone to separate them from gaseous reactants, continuing the recycling of the separated gases in relatively large quantities to said reaction zone to provide a high degree of agitation and thereby a high rate of reaction and volatilization, while the heat added thereto in the reheating step assists in maintaining the reaction temperature within the lower limit of the reaction temperature range as well as assisting in volatilization of products, and passing the liquid products and alcohol separated by said condensation to further separatory treatments which provide substantially the sole source of aldehyde product.

9. A process according to claim 8, wherein the soluble cobalt content in the reaction zone is held below 2% by maintaining the carbon monoxide content of synthesis gases in the reaction zone below about 25%, the olefin content of the synthesis gas in the reaction zone is maintained below about 20% to suppress formation of waxes and olefinic condensation products which adversely affect catalyst activity, and the reactants pass into the upper end of the reaction zone and travel substantially the length of the zone before becoming commingled with the contents of the reaction zone.

References Cited in the file of this patent

UNITED STATES PATENTS

| | | |
|---|---|---|
| 2,504,682 | Harlan | Apr. 18, 1950 |
| 2,576,113 | Hagemeyer | Nov. 17, 1951 |
| 2,628,981 | Burney et al. | Feb. 17, 1953 |
| 2,637,746 | Parker | May 5, 1953 |

OTHER REFERENCES

German Patent Application I 73,291 IVd/120, O. Z. 13705, deposited in the Library of Congress, Apr. 18, 1946, in T. O. M. Reel 36, Item 21 and part of Item 36. Available in Meyer Translation PC-S-V, pp. 62-63.

Fiat Final Report 1000, PB 81, 383, pp. 7-24, 69-72. Available to public Dec. 26, 1947.